Dec. 7, 1965   D. J. MARSHALL   3,222,091
PRESSURE RESPONSIVE FLUID TIGHT HOSE COUPLING
Filed Aug. 30, 1962   2 Sheets-Sheet 1

INVENTOR:
DON J. MARSHALL
BY
Howson & Howson
ATTYS.

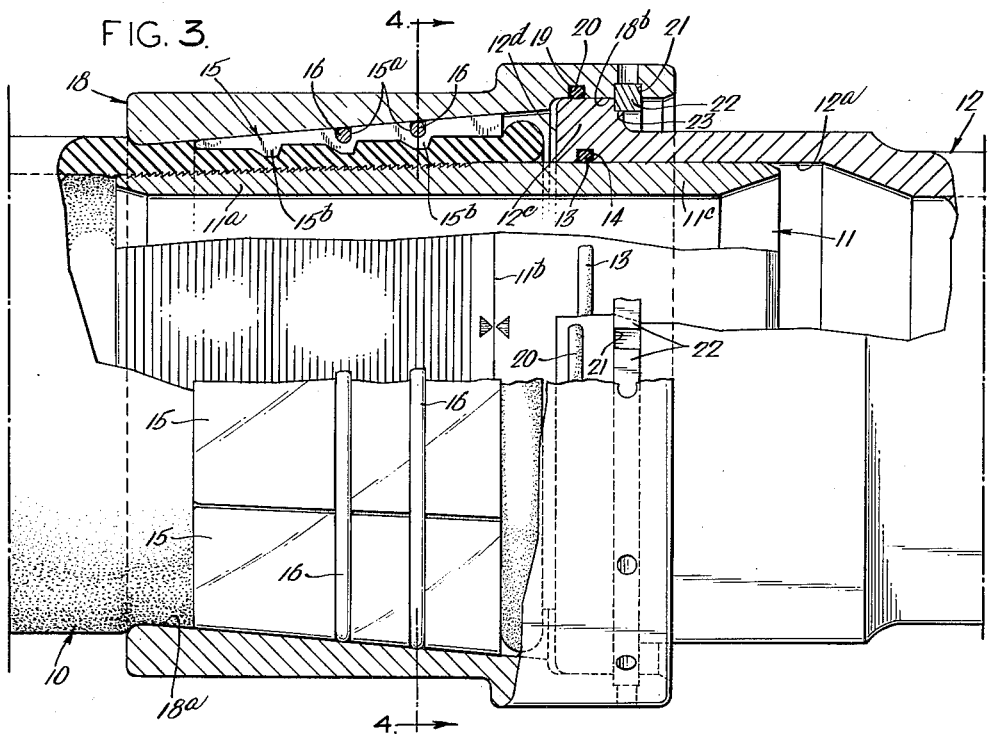
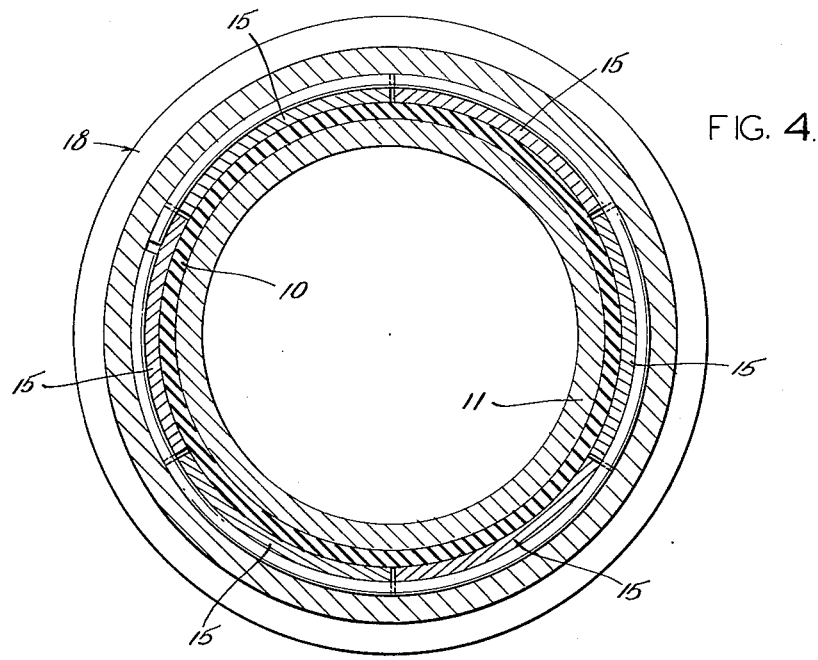

United States Patent Office 3,222,091
Patented Dec. 7, 1965

3,222,091
PRESSURE RESPONSIVE FLUID TIGHT
HOSE COUPLING
Don J. Marshall, Edgewater, Md., assignor to Dixon Valve & Coupling Company, Philadelphia, Pa., a corporation of Pennsylvania
Filed Aug. 30, 1962, Ser. No. 220,400
5 Claims. (Cl. 285—95)

This invention relates to a hose coupling connection and has for an object the provision of improvements in this art.

One of the particular objects of the invention is to provide a hose connection which will hold the hose very securely and which will be self-tightening as the forces tending to separate the hose from the connection increase.

Another object is to provide a hose connection which completely seals the connected hose end both inside and out to prevent deterioration.

Another object is to provide a hose connection which does not require skiving when making a connection with a cable or wire reinforced hose.

Another object is to provide a hose connection which does not materially mar the inside lining of the hose.

Another object is to provide a hose connection which is simple and easily manufactured and installed.

Another object is to provide a hose connection which is re-usable and which can be quickly assembled and disassembled.

The above and other objects of the invention as well as certain novel features and advantages will be apparent from the following description of an exemplary embodiment, reference being made to the accompanying drawings thereof, wherein:

FIG. 3 is a view like FIG. 1 but showing the position of parts after an extreme load has been imposed on the connection;

FIG. 4 is a transverse section taken on the line 4—4 of FIG. 3;

Figure 2:
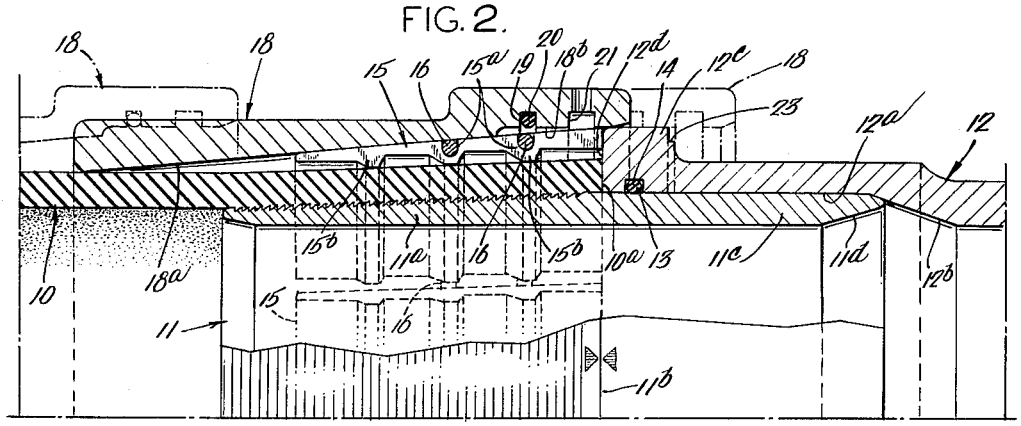
FIG. 2 is a view like FIG. 1 but showing the parts in position prior to the final assembly position.

As shown in the drawings, a hose 10 has a nipple 11 forced into its end for the length of an exterior tapered portion 11a, the end of which is indicated by a circumferential line 11b. The remaining length 11c of the nipple is cylindrical exteriorly. The interior surface is cylindrical over most of the nipple length and terminates in an interior outwardly tapered inner end 11d. It will be seen that the effective transverse area of the nipple is greater at the inner end than at the outer end so that in service there is a differential pressure tending to force the nipple outwardly, this being in addition to the usual force tending to force the hose off the connection.

The cylindrical portion 11c of the nipple closely fits and is slidable within the cylindrical bore portion 12a of a coupling member 12, a seal, such as a rubber O-ring 13 in a groove 14 of the member 12, preventing fluid carried interiorly from reaching and deteriorating the end wall 10a of the hose. The coupling member 12 is tapered down interiorly at 12b and its remote end portion (not shown) may be formed in any suitable way for connection to a mating part.

The outer tapered surface 11a of the nipple is roughened as by shallow grooves and ridges, about on the order of phonograph record grooves, this roughening being found to provide a very great increase in holding efficiency in the rubber lining of the hose.

Figure 5:
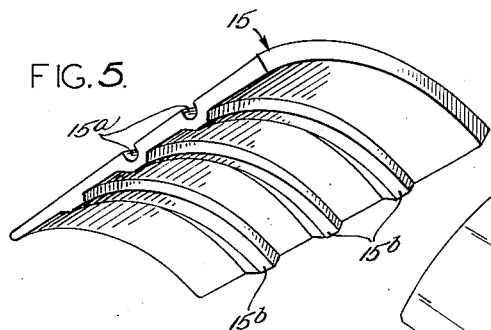
FIG. 5 is an inside perspective view of a gripper segment.
Figure 6:
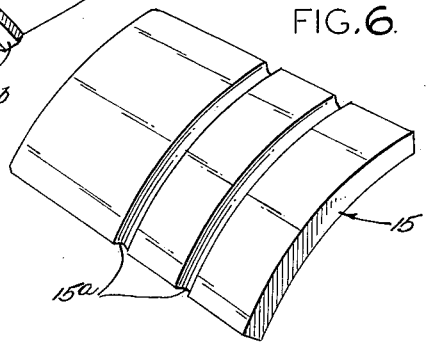
FIG. 6 is an outside perspective view of the gripper segment.

A plurality of gripping wedge segments 15 (here six) are positioned on the end of the hose with equal spaces between them and are held in place during assembly by resilient rings 16 in grooves 15a in the segments. Interiorly the gripping segments are provided with circumferential hose engaging projections 15b separated by shallow grooves 15c which are relatively wide axially whereby to limit the extent of penetration into the outer rubber covering of the hose. The gripping segments are shown in detail in FIGS. 5 and 6.

The coupling member 12 is provided with an annular rib or flange 12c arising from its end wall 12d against which the end wall of the hose abuts in assembly. The end walls of the gripping segments 15 also abut the end wall 12d of the coupling member in assembly. If desired, the coupling member on its end wall or on the outer surface of the rib 12c may be provided with markings, not shown, to indicate the correct circumferential assembly spacing of the gripping segments.

A collar or sleeve member 18 is provided with a tapered inner surface 18a which embraces the outer surface of the gripping wedge segments to squeeze them down on the hose as the collar is pulled up axially toward the coupling member. The collar is provided with an interior cylindrical surface 18b which closely fits and slides on the outer cylindrical surface of the rib 12c and which is provided with an interior groove 19 carrying an O-ring 20 which seals the end wall of the hose against deteriorating fluids from the outside.

Nearer its connecting end the collar 18 is provided with an annular interior groove 21 which, when the parts are pulled together somewhat past the final assembly position, receives a split locking ring 22. An outer annular shoulder 23 on the end of the rib retains the ring 23 against accidental displacement when the parts pull back together after the ring has been installed. To remove the ring to separate the parts it is only necessary to pull the parts fully together again so the lock ring clears the shoulder 23 (as shown in broken lines in FIG. 2) and to pry out the lock ring by inserting a tool between its ends at the split location or by providing holes in the collar above the ring for the insertion of a tool to push it progressively inward, starting at one end. This is disclosed in another application.

In FIG. 2 a pre-assembly condition is shown. At a prior stage (shown in broken lines) the collar was located further down on the hose beyond the wedge segment zone so the segments could be accurately spaced and the rings 16 put on them to hold them in place. The rings 16 clear the tapered inside surface of the collar or sleeve.

Figure 1:
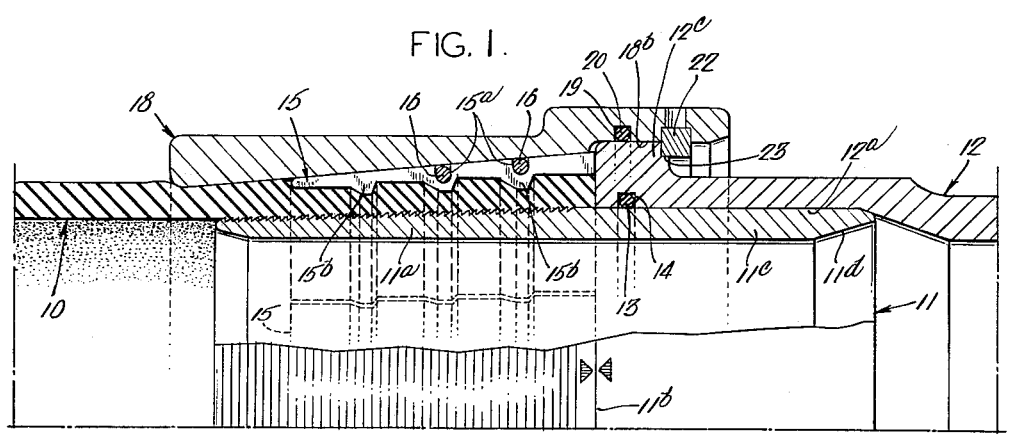
FIG. 1 is a longitudinal section and elevation of a hose connection embodying the invention.

FIG. 1 shows the fully assembled condition, the next to final condition where the parts are fully pulled together for the insertion of the locking ring being clear from FIG. 2.

FIG. 3 illustrates a condition where a very heavy load is imposed on the connection. By comparison with FIG. 1 it is seen that the floating nipple 11, the hose 10 and the wedge gripping segments all move down together as a unit to cause the segments and nipple to squeeze the hose wall more tightly between them as the wedge segments are forced inward by the tapered conical surface of the collar. In this action the nipple acts like a floating piston and its outer cylindrical surface slides freely within the inner cylindrical surface of the coupling member, the O-ring 13 maintaining a seal between the nipple and the coupling member at all times. There is no relative axial movement of any of the parts along the hose surfaces and there is practically no damage to the hose except under most extreme loadings as would entail almost complete destruction to separate the parts. After all normal loading use the parts are separable and good for re-use.

The hose-engaging projections or teeth on the wedge segments are of a length to pass through the outer rubber layer and engage the reinforcement of the hose. The teeth are rounded on their edges to avoid damage to the hose as far as possible and also to avoid making cuts to start breaks.

The wedges are thicker at their ends at the hose end wall than at the other end and the taper on the nipple is somewhat less than the taper on the inside surface of the collar. This makes a very effective self-tightening arrangement and grips the end of the hose more strongly at the end and gradually less at a distance from the end, thereby lessening the danger of breakage of the hose at the outer end of the connection.

It will be noted from FIG. 3 that even in an overstrained condition the end of the nipple does not come more than a slight distance past the end of the collar or sleeve 18 and both are well-rounded on the edges thereby lessening the danger of damage to the hose here.

The self-tightening action is capable of causing a volume displacement of as much as about 34% of the hose wall.

The major cause of hose failure with prior connections has been corrosion and rusting of the wire reinforcement of the hose wall. Since the present connection does not require skiving to expose the reinforcement on the side and since the end wall of the hose is sealed from fluids, both inside and out, there is no danger of failure from this cause.

Because of the sliding action of the nipple the connection is instantly responsive to any increase or surge of pressure to effect the self-tightening action.

It is thus seen that this hose connection provides, among others, the following advantages:

(1) A full sealing effect, inside and out, for the end of the hose, (2) Constant and instant self-tightening action without any sliding movement of parts relative to either the inside or outside surface of the hose, (3) A demountable and re-usable assembly, (4) Installation and disassembly without special tools, the most complex tool required being a pulling press or puller which is readily available, (5) Does not require skiving the hose either inside or out, (6) Limits penetration into the hose wall by connection elements thereby avoiding damage to the covering of the hose. The gripping teeth are short and round-edged with wide spacing between to penetrate enough but to a definite safe limit; and the phonograph type roughening on the nipple provides a very firm grip without damage to the hose surface, (7) It is very compact and free from external projections.

While one embodiment of the invention has been disclosed for purposes of illustration, it is to be understood that there may be various embodiments and modifications within the general scope of the invention.

I claim:

1. In a hose connection for securing the terminal end of a hose, a tubular coupling member axially aligned with said hose and having a radial flange forming an end wall stop for the terminal end of said hose; a tubular nipple mounted interiorly of said hose and having a portion slidably mounted interiorly of said coupling member; said nipple having an exteriorly tapered portion positioned interiorly of said hose, said nipple having a greater effective transverse area at the end of the nipple interiorly of said coupling member than the effective transverse area at its other end; a plurality of axially oriented wedges circumscribing said hose, superimposed of said tapered portion of said nipple mounted interiorly of said hose, said wedges having an axially tapered outer surface; a tubular sleeve having a tapered conical inner surface circumscribing said wedge segments and engageable therewith, said taper of said sleeve being substantially the same as the taper of said wedges, and means securing said sleeve to said coupling member to hold it against axial movement relative thereto, whereby when in operation a differential force is set up in said nipple tending to force said nipple out of said coupling member and to cause axial movement of said hose and said wedges thereby increasing the radial pressure between said nipple and said wedges upon said hose.

2. In a hose connection in accordance with claim 1 including: a first annular seal mounted between said nipple and said coupling member, and a second annular seal mounted between said coupling member and said sleeve.

3. In a hose connection in accordance with claim 1 wherein said sleeve has a cylindrical inner surface portion overlapping and engaging said flange on said coupling member, said overlapping inner surface portion having a circumferential groove therein overlying a circumferential groove in said flange, and wherein said means for securing said collar to said coupling member comprises a resilient ring means fittable in said groove.

4. In a hose connection as set forth in claim 1 wherein said tapered portion of said nipple has a serrated outer surface.

5. In a hose connection in accordance with claim 1 wherein the interior surface of said wedges are provided with circumferential hose engaging projections, and the exterior of said wedges are provided with circumferential grooves for receiving resilient rings to press said wedges against said hose during assembly of said hose connection.

References Cited by the Examiner

UNITED STATES PATENTS

| 1,486,421 | 3/1924 | Dyer | 285—259 |
|---|---|---|---|
| 2,485,976 | 10/1949 | Main | 285—256 |
| 2,516,583 | 7/1950 | Moore | 285—259 |
| 2,935,299 | 5/1960 | Jansen | 285—322 |
| 2,935,343 | 5/1960 | Ellis | 285—321 |
| 2,940,778 | 6/1960 | Kaiser | 285—95 |

FOREIGN PATENTS

| 564,619 | 10/1923 | France. |
|---|---|---|
| 1,201,120 | 7/1959 | France. |
| 525,374 | 5/1931 | Germany. |
| 431,918 | 7/1935 | Great Britain. |
| 564,515 | 10/1944 | Great Britain. |
| 786,330 | 11/1957 | Great Britain. |
| 505,361 | 12/1954 | Italy. |

CARL W. TOMLIN, *Primary Examiner.*

THOMAS F. CALLAGHAN, *Examiner.*